US011586641B2

(12) United States Patent
Mukherjee et al.

(10) Patent No.: US 11,586,641 B2
(45) Date of Patent: *Feb. 21, 2023

(54) METHOD AND MECHANISM FOR EFFICIENT RE-DISTRIBUTION OF IN-MEMORY COLUMNAR UNITS IN A CLUSTERED RDBMS ON TOPOLOGY CHANGE

(71) Applicant: ORACLE INTERNATIONAL CORPORATION, Redwood Shores, CA (US)

(72) Inventors: Niloy Mukherjee, Belmont, CA (US); Kartik Kulkarni, Foster City, CA (US); Tirthankar Lahiri, Palo Alto, CA (US); Vineet Marwah, San Ramon, CA (US); Juan Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 16/726,059

(22) Filed: Dec. 23, 2019

(65) Prior Publication Data
US 2020/0133950 A1 Apr. 30, 2020

Related U.S. Application Data

(63) Continuation of application No. 15/008,297, filed on Jan. 27, 2016, now Pat. No. 10,528,580.

(51) Int. Cl.
*G06F 16/2458* (2019.01)
*H04L 43/0817* (2022.01)
(Continued)

(52) U.S. Cl.
CPC ...... *G06F 16/2477* (2019.01); *H04L 41/0668* (2013.01); *H04L 43/0817* (2013.01); *H04L 41/12* (2013.01)

(58) Field of Classification Search
CPC ........... G06F 16/2477; G06F 17/30584; H04L 41/0668; H04L 43/0817; H04L 41/12
See application file for complete search history.

(56) References Cited

U.S. PATENT DOCUMENTS

| 8,719,462 B1 * | 5/2014 | He | G06F 17/40 710/20 |
| 9,405,483 B1 * | 8/2016 | Wei | G06F 3/065 |

(Continued)

OTHER PUBLICATIONS

Mukherjee, U.S. Appl. No. 14/805,949, filed Jul. 22, 2015, Office Action, dated Mar. 14, 2018.

(Continued)

*Primary Examiner* — Usmaan Saeed
*Assistant Examiner* — William P Bartlett
(74) *Attorney, Agent, or Firm* — Hickman Becker Bingham Ledesma LLP

(57) ABSTRACT

Techniques are described herein for executing queries on distinct portions of a database object that has been separate into chunks and distributed across the volatile memories of a plurality of nodes in a clustered database system. The techniques involve redistributing the in-memory database object portions on changes to the clustered database system. Each node may maintain a mapping indicating which nodes in the clustered database system store which chunks, and timestamps indicating when each mapping entry was created or updated. A query coordinator may use the timestamps to select a database server instance with local in memory access to data required by a portion of a query to process that portion of the query.

16 Claims, 7 Drawing Sheets

(51) Int. Cl.
*H04L 41/0668* (2022.01)
*H04L 41/12* (2022.01)

(56) References Cited

U.S. PATENT DOCUMENTS

| | | |
|---|---|---|
| 2009/0265306 A1 | 10/2009 | Barsness |
| 2014/0025770 A1 | 1/2014 | Warfield |
| 2014/0337338 A1 | 11/2014 | Shinn |
| 2015/0067086 A1 | 3/2015 | Adriaens |
| 2016/0026684 A1 | 1/2016 | Mukherjee et al. |
| 2016/0188426 A1 | 6/2016 | Kousha |
| 2016/0301751 A1 | 10/2016 | Peelen |
| 2016/0371356 A1 | 12/2016 | Lee |
| 2017/0212939 A1 | 7/2017 | Mukherjee et al. |

OTHER PUBLICATIONS

Mukherjee, U.S. Appl. No. 15/008,297, filed Jan. 27, 2016, Office Action, dated Jul. 11, 2018.
Mukherjee, U.S. Appl. No. 15/008,297, filed Jan. 27, 2016, Notice of Allowance, dated Aug. 26, 2019.
Mukherjee, U.S. Appl. No. 15/008,297, filed Jan. 27, 2016, Interview Summary, dated Feb. 19, 2019.
Mukherjee, U.S. Appl. No. 15/008,297, filed Jan. 27, 2016, Final Office Action, dated Dec. 11, 2018.
Mukherjee, U.S. Appl. No. 15/008,297, filed Jan. 7, 2016, Adviosry Action, dated Mar. 21, 2019.
Mukherjee, U.S. Appl. No. 14/805,949, filed Jul. 22, 2015, Office Action, dated Oct. 4, 2017.
Mukherjee, U.S. Appl. No. 14/805,949, filed Jul. 22, 2015, Final Office Action, dated Oct. 9, 2018.
Mukerjee, U.S. Appl. No. 14/805,949, filed Jul. 22, 2015, Notice of Allowance, dated Jan. 24, 2019.
Torres, Gabriel, "How the Cache Memory Works_Hardware Secrets", hardwaresecrets.com, dated Sep. 12, 2007, 5 pages.
Paul et al., "Distributed Caching with Centralized Control", Computer Communicaitons vol. 24, pp. 256-268, dated 2001.

\* cited by examiner

MAPPING FOR NODE 102

| IMCU | IMCU BOUNDARIES | [HOST, REG_TIME] | IMCU OFFSET |
|---|---|---|---|
| 222 | <E1, E2> | [NODE 102,T1A]<br>[NODE 122,T2A] | NON-NULL |
| 224 | <E2', E3> | [NODE 112,T3A]<br>[NODE 132,T3A] | NULL |
| 226 | <E3', E4> | [NODE 122,T4A]<br>[NODE 102,T5A] | NON-NULL |
| 228 | <E4', E5> | [NODE 132,T6A]<br>[NODE 112,T6A] | NULL |

MAPPING FOR NODE 112

| IMCU | IMCU BOUNDARIES | [HOST, REG_TIME] | IMCU OFFSET |
|---|---|---|---|
| 222 | <E1, E2> | [NODE 102,T1B]<br>[NODE 122,T1B] | NULL |
| 224 | <E2', E3> | [NODE 112,T2B]<br>[NODE 132,T3B] | NON-NULL |
| 226 | <E3', E4> | [NODE 122,T4B]<br>[NODE 102,T4B] | NULL |
| 228 | <E4', E5> | [NODE 132,T5B]<br>[NODE 112,T6B] | NON-NULL |

MAPPING FOR NODE 122

| IMCU | IMCU BOUNDARIES | [HOST, REG_TIME] | IMCU OFFSET |
|---|---|---|---|
| 222 | <E1, E2> | [NODE 102,T1C]<br>[NODE 122,T2C] | NON-NULL |
| 224 | <E2', E3> | [NODE 112,T3C]<br>[NODE 132,T3C] | NULL |
| 226 | <E3', E4> | [NODE 122,T4C]<br>[NODE 102,T5C] | NON-NULL |
| 228 | <E4', E5> | [NODE 132,T6C]<br>[NODE 112,T6C] | NULL |

MAPPING FOR NODE 132

| IMCU | IMCU BOUNDARIES | [HOST, REG_TIME] | IMCU OFFSET |
|---|---|---|---|
| 222 | <E1, E2> | [NODE 102,T1D]<br>[NODE 122,T1D] | NULL |
| 224 | <E2', E3> | [NODE 112,T2D]<br>[NODE 132,T3D] | NON-NULL |
| 226 | <E3', E4> | [NODE 122,T4D]<br>[NODE 102,T4D] | NULL |
| 228 | <E4', E5> | [NODE 132,T5D]<br>[NODE 112,T6D] | NON-NULL |

FIG. 3

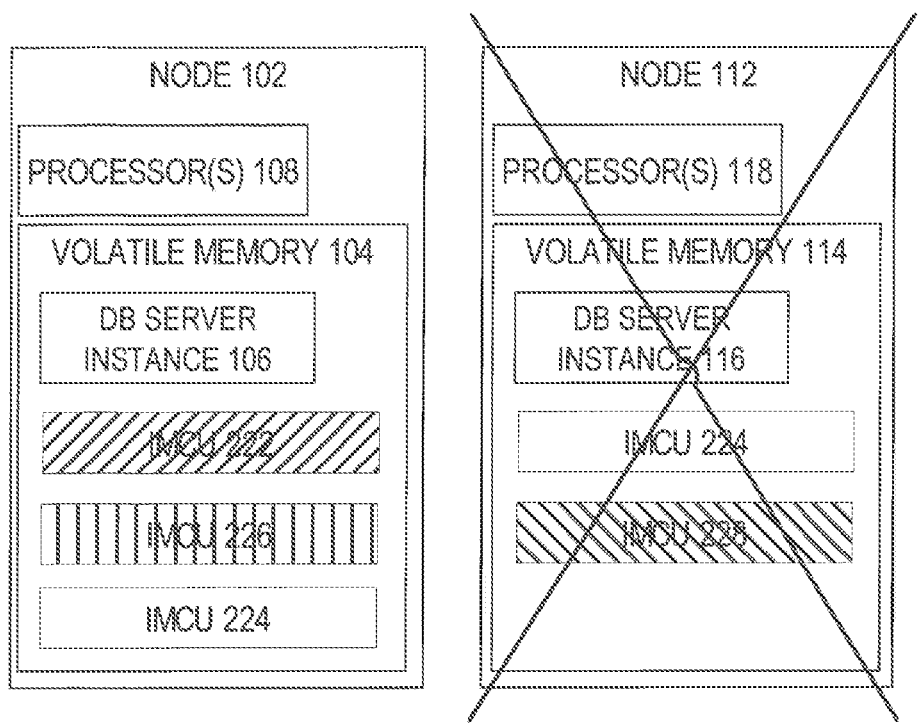
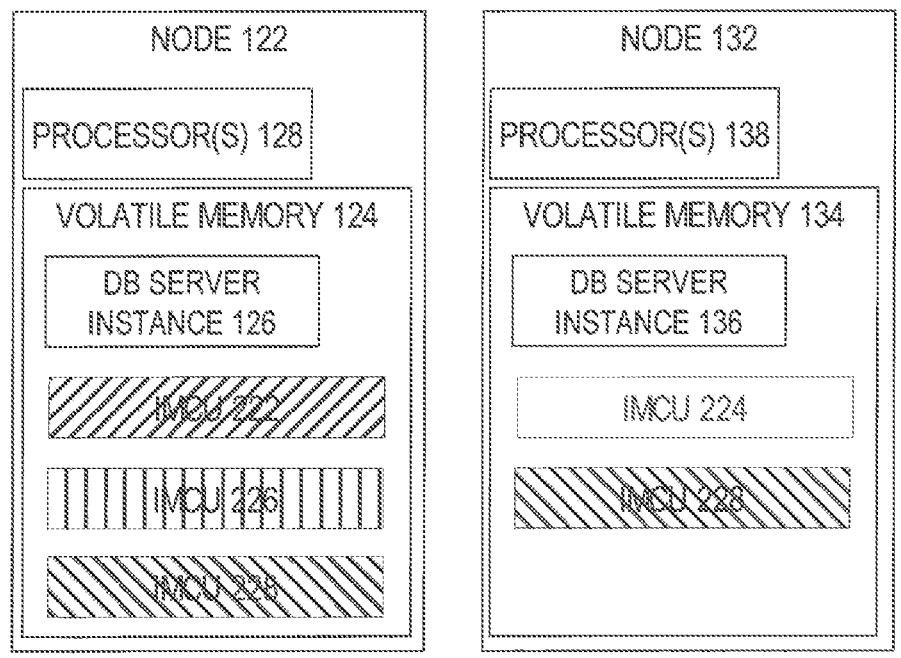
FIG. 4

MAPPING FOR NODE 102

| IMCU | IMCU BOUNDARIES | IMCU HOME LOCATION | IMCU OFFSET |
|---|---|---|---|
| 222 | <E1, E2> | [NODE 102,T1A] [NODE 122,T2A] | NON-NULL |
| 224 | <E2', E3> | [NODE 102,T7A] [NODE 132,T3A] | NON-NULL |
| 226 | <E3', E4> | [NODE 122,T4A] [NODE 102,T5A] | NON-NULL |
| 228 | <E4', E5> | [NODE 132,T6A] [NODE 122,T8A] | NULL |

MAPPING FOR NODE 122

| IMCU | IMCU BOUNDARIES | IMCU HOME LOCATION | IMCU OFFSET |
|---|---|---|---|
| 222 | <E1, E2> | [NODE 102,T1C] [NODE 122,T2C] | NON-NULL |
| 224 | <E2', E3> | [NODE 102,T7C] [NODE 132,T3C] | NULL |
| 226 | <E3', E4> | [NODE 122,T4C] [NODE 102,T5C] | NON-NULL |
| 228 | <E4', E5> | [NODE 132,T6C] [NODE 122,T8C] | NON-NULL |

MAPPING FOR NODE 132

| IMCU | IMCU BOUNDARIES | IMCU HOME LOCATION | IMCU OFFSET |
|---|---|---|---|
| 222 | <E1, E2> | [NODE 102,T1D] [NODE 122,T1D] | NULL |
| 224 | <E2', E3> | [NODE 102,T7D] [NODE 132,T3D] | NON-NULL |
| 226 | <E3', E4> | [NODE 122,T4D] [NODE 102,T4D] | NULL |
| 228 | <E4', E5> | [NODE 132,T5D] [NODE 122,T8D] | NON-NULL |

METHOD AND MECHANISM FOR EFFICIENT RE-DISTRIBUTION OF IN-MEMORY COLUMNAR UNITS IN A CLUSTERED RDBMS ON TOPOLOGY CHANGE

BENEFIT CLAIM

This application claims the benefit as a Continuation of application Ser. No. 15/008,297, filed Jan. 27, 2016 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to data storage and retrieval techniques in a database cluster, and more specifically, to methods and mechanisms for efficient redistribution of in-memory columnar units in a multi-node database on topology change.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other items that have been requested.

Rather than load individual data items on a per-item basis, entire database objects, or portions thereof, may be loaded into volatile memory. Various approaches for loading entire database objects, or selected portions thereof, into volatile memory to speed up query processing are described in U.S. patent application Ser. No. 14/377,179, entitled "Mirror, In Memory, Data from Disk To Improve Query Performance," filed Jul. 21, 2014, referred to herein as the "Mirroring" application, the contents of which are incorporated herein in its entirety.

According to the approaches described in the Mirroring application, data objects, or portions thereof, are stored in volatile memory in a different format than the format that those same objects have on disk. For example, the in-memory version of the objects may be in a column-major format, while the on-disk version stored data in a row-major format. The in-memory version of the object (or selected portions thereof), is referred to as an In-Memory Compression Unit (IMCU) because the data contained therein is often compressed.

In a clustered database system, multiple "nodes" have access to the same on-disk copy of a database. Typically, each node is a computing device with its own local memory and processors that are running one or more database server instances. The database server instances on each of the nodes may receive queries to access the database. The speed at which a given database server instance is able to answer a query is based, at least in part, on whether the node on which the database server instance is running has the requested data cached within its local volatile memory. Consequently, to improve every node's performance of queries that access data in a Table X, Table X may be loaded into the volatile memory of every node in the cluster.

Unfortunately, loading the same data (e.g. Table X) into the volatile memory of every node in a cluster of N nodes means that the cluster can only cache approximately the same amount of data as a single node, even though a cluster of N nodes has N times the amount of volatile memory as a single node.

Rather than load the same data into the memory of every node in a cluster, the portions of data objects (or "chunks") may be distributed across the nodes in the cluster. Various approaches for distributing the database objects, or selected portions thereof, among nodes and executing queries in the multi-node database are described in U.S. patent application Ser. No. 14/805,949, entitled "Framework for Volatile Memory Query Execution in a Multi-Node Cluster," filed Jul. 22, 2015 referred to herein as the "Hashing" application, the contents of which are incorporated herein in its entirety.

Each node in the cluster that has been assigned to load a copy of a particular chunk into the node's volatile memory is referred to herein as a "host node" of the particular chunk. According to the approaches described in the Hashing application, all chunks are not hosted by all nodes. Rather, any given chunk is hosted by a subset of the nodes in the cluster. By using the same hashing function, each node in the cluster may independently determine that a particular node has been assigned to host a particular chunk. Each node may maintain a chunk-to-node mapping to indicate how chunks are distributed across the volatile memories of the multiple nodes. Using the chunk-to-node mapping, nodes may select to whom to send work. For example, a node that has received a query that requires access to a particular chunk may send the work to a node, in the cluster, that is hosting that chunk in its volatile memory.

However, when a node is removed from or added to a cluster, the other nodes in the cluster need to update their chunk-to-node mapping to reflect the change. Immediately after such a change, distributing work based on the chunk-to-node mappings may result in inefficiencies. For example, a node that has been newly assigned to a host particular chunk may not have finished storing the chunk in its volatile memory. Sending work involving that chunk to that node will be inefficient, especially if another node has already loaded that same chunk. As another example, an out-of-date mapping may indicate a particular node is assigned to host a particular chunk, but due to a change the particular node may no longer be in the cluster.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a block diagram illustrating the associated chunk-to-node mappings for four nodes;

FIG. 4 is a block diagram illustrating a database object divided into chunks and distributed across volatile memory of three nodes;

FIG. 5 is a block diagram illustrating the associated chunk-to-node mappings for three nodes;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In-Memory Chunks

As mentioned above, distinct portions of database objects may be distributed across the volatile memories of a plurality of nodes in a clustered database system. The portion of a database object that is assigned to any given node is referred to herein as a "chunk." In some embodiments, within the volatile memory of a node, each such chunk is encapsulated in a distinct in-memory compression unit ("IMCU"). In some embodiments, the data items in a chunk that has been loaded into volatile memory are in a different format than those same data items on disk. For example, the disk copy of the items may be in row-major format, while the in-memory copy of the items may be in column-major format. In alternative embodiments, the in-memory representation of a chunk may have other formats, including the same format in which the data for the chunk is represented on disk. Distributing any given chunk of a database object to a strict subset of the nodes in a cluster avoids the situation in which the same data is consuming volatile memory in every one of the nodes of the cluster.

General Overview

Techniques are described herein for avoiding inefficiencies that may occur when chunk hosting assignments are changed when nodes join or leave the cluster. Such inefficiencies include, for example, sending work involving data items in a chunk to a node that is assigned to host the chunk, but which has not actually finished loading the chunk into volatile memory. Such inefficiencies can also include sending work involving data items in a chunk to a host node for the chunk that has failed, or has otherwise left the cluster.

According to one embodiment, to avoid the inefficiencies that result when distributing work to nodes after a node joins or leaves the cluster, the nodes maintain various timestamp information. The node that receives a query (the "coordinator node") uses the timestamp information when selecting the host node to which to send work that involves a particular chunk. For example, if node A is the coordinating node for a query that requires access to data items in chunk X, and chunk X is hosted at nodes B, C, and D, then node A uses the timestamp information to decide whether to send the work involving chunk X to node B, C or D. As shall be explained in greater detail hereafter, techniques are described in which the coordinating node makes such decisions based on (a) a registration timestamp, (b) a global completion timestamp, and (b) the startup timestamp, associated with each host node.

System Overview

Figure 1:
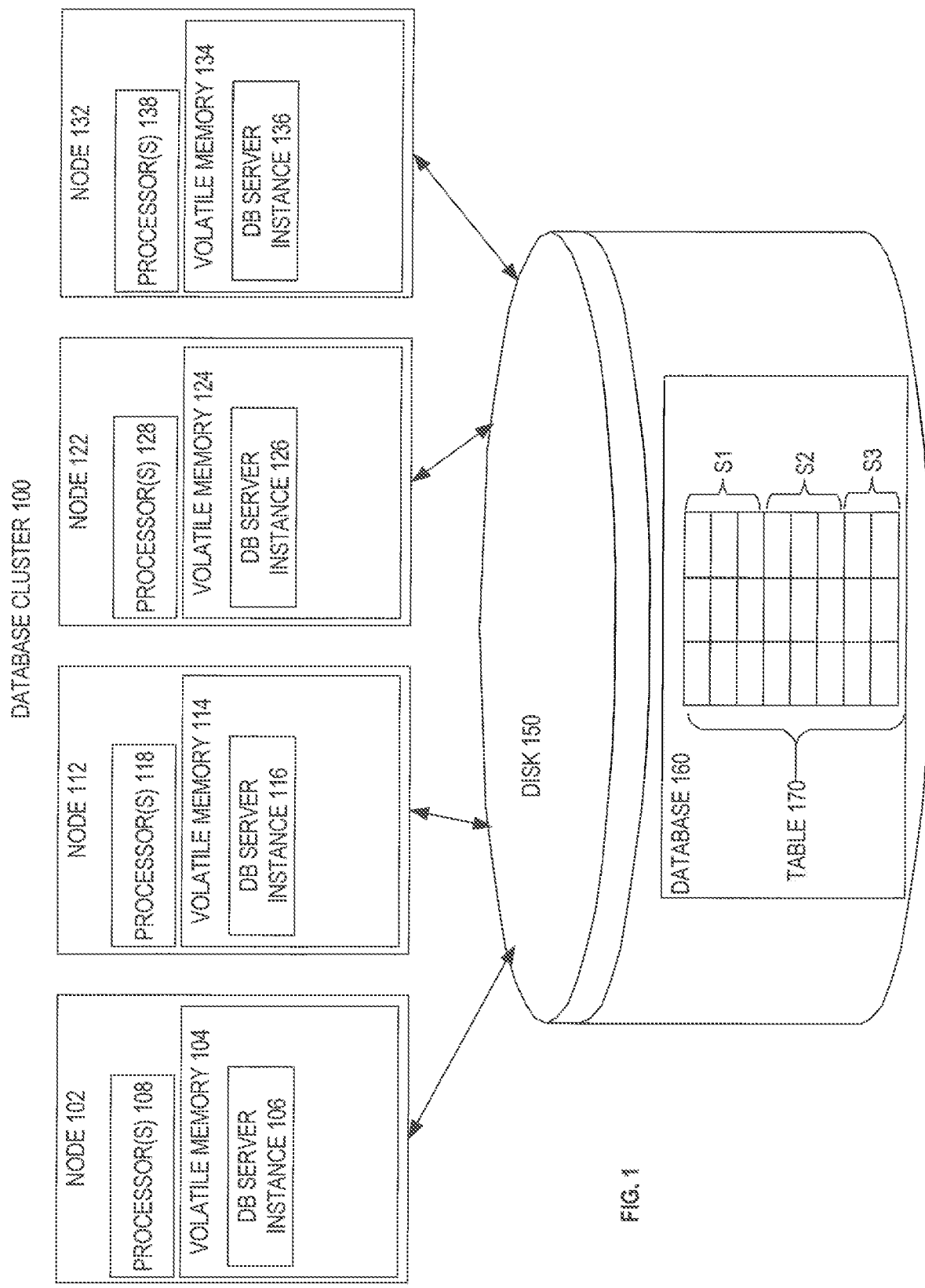
FIG. 1 is a block diagram illustrating a system architecture of a database cluster.

Referring to FIG. 1, it is a block diagram that depicts a database cluster 100 according to one embodiment. In the embodiment illustrated in FIG. 1, four nodes 102, 112, 122, and 132 have access to the same database 160. For the purpose of illustration, database 160 is shown as stored on a single shared disk 150, but in alternative embodiments may be spread across multiple disks to which each of nodes 102, 112, 122, and 132 have access.

Nodes 102, 112, 122, and 132 respectively have one or more processors 108, 118, 128, and 138, and local volatile memory 104, 114, 124, and 134. In addition, nodes 102, 112, 122, and 132 are respectively executing database server instances 106, 116, 126, and 136. While in the illustrated embodiment each node is executing a single database server instance, in alternative embodiments a single node may execute more than one database server instance.

Database 160 includes a table 170. Each of nodes 102, 112, 122, and 132 is able to access data items from table 170 from the copy of table 170 that resides on disk 150. However, it is much faster for any given database server instance to access data items of table 170 that are cashed in the volatile memory that resides on the node in which the database server instance is executing.

Table 170 is composed of three segments (S1, S2, and S3), where a "segment" is one or more extents, and where an "extent" is a contiguous series of on-disk data blocks. According to one embodiment, if segment S1 of table 170 has been designated as "in-memory enabled," distinct chunks of segment S1 are loaded into each of volatile memories 104, 114, 124, and 134. The loading of the chunks of segment S1 into volatile memories 104, 114, 124, and 134 may be performed pro-actively, or on an as-needed basis. Nodes 102, 112, 122, and 132 may determine which chunks of segment S1 are to be loaded into each of nodes 102, 112, 122, and 132 by using a hash function. In an embodiment, nodes 102, 112, 122, and 132 use a rendezvous hash function to determine which node will host which chunks of segment S1.

For the purpose of illustration, individual segments of a table are divided into chunks that are distributed among the various nodes of a multi-node system. However, entire table partitions, or entire tables, may be memory-enabled and divided into chunks that are distributed among the various nodes of a multi-node system. The granularity at which the chunks are determined may vary from implementation to implementation, and the techniques described herein are not limited to any particular level of granularity.

Lock Managers

According to one embodiment, the locks for any given segment are managed by one of the nodes in the cluster. The node that manages the locks for a segment is referred to herein as the "lock-manager" for that segment. According to one embodiment, the segment-to-lock-manager mapping is based on an identifier associated with the segment. Consequently, given the segment identifier, any node in the cluster 100 is able to determine the lock manager for of any segment.

For the purposes of illustration, it shall be assumed that the lock managers for segments S1, S2 and S3 of table 170 are nodes 102, 112 and 122, respectively. The lock-manager for a segment will receive a lock request from one or more nodes in response to occurrence of an event that triggers the loading of the segment. Events that trigger the loading of a segment are referred to herein as "load-segment events."

In the present example, if a load-segment event for segment S1 of table 170 occurs in database server instance 126, database server instance 126 responds to the load-segment event by attempting to obtain an exclusive lock to become the "master" of the load-segment operation for segment S1. The lock manager for segment S1 is node 102, so database server instance 126 sends a lock request to node 102.

The database server instance that is granted the load-master lock thereby becomes the load-operation master. The load-operation master is responsible for coordinating the loading of that segment into volatile memory. The segment to be loaded is referred to herein as the "target segment."

Determining Chunk Assignments

Figure 2:
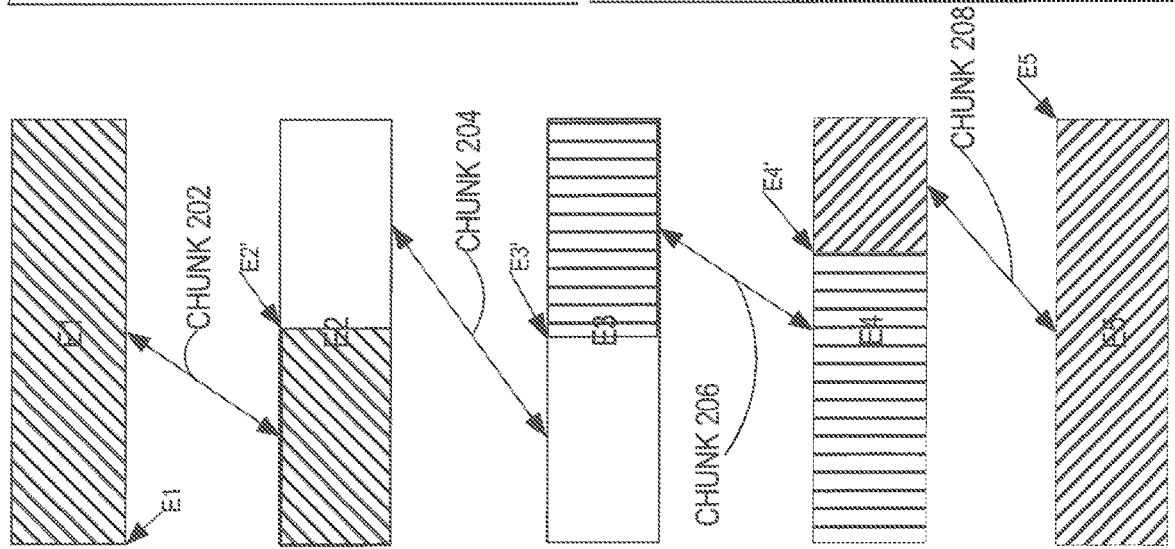
FIG. 2 is a block diagram illustrating a database object divided into chunks and distributed across volatile memory of four nodes.

For the purpose of explanation, it shall be assumed that segment S1 has been divided into five extents E1, E2, E3, E4, and E5. It shall further be assumed that the data from these five extents (E1, E2, E3, E4, and E5) should be divided into four chunks. Referring to FIG. 2, it illustrates how the five extents of S1 may be mapped to four chunks 202, 204, 206, and 208, and how the chunks may be assigned to nodes 102, 112, 122, and 132. Specifically, data for the first chunk 202 includes all data from extent E1 and some data from extent E2. Data for the second chunk 204 includes the rest of the data from extent E2 and some of the data from extent E3. Data for the third chunk 206 includes the rest of extent E3 and some of the data from extent E4. Finally, data for the fourth chunk 208 includes the rest of extent E4 and all of extent E5.

Once the data for each chunk has been determined, the load-operation master determines which node will host the IMCU for each chunk. According to one embodiment, the same chunk can be hosted at multiple nodes. Referring again to FIG. 2, it is a block diagram illustrating how the chunks 202, 204, 206, and 208 into which segment S1 has been divided may be redundantly hosted in a multi-node database cluster. FIG. 2 illustrates the state of cluster 100 after chunks 202, 204, 206, and 208 have been redundantly loaded into nodes 102, 112, 122, and 132. As illustrated in FIG. 2, chunks 202, 204, 206, and 208 are distributed as follows:

Node 102 has a copy of IMCU 222 (for chunk 202) and a copy of IMCU 226 (for chunk 206)
Node 112 has a copy of IMCU 224 (for chunk 204) and a copy of IMCU 228 (for chunk 208)
Node 122 has a copy of IMCU 222 (for chunk 202) and a copy of IMCU 226 (for chunk 206)
Node 132 has a copy of IMCU 224 (for chunk 204) and a copy of IMCU 228 (for chunk 208)

For the purpose of illustration, the IMCU for each chunk is hosted at two nodes. However, any number of nodes may host the IMCU for any given chunk.

In an embodiment, the nodes that are assigned to host the IMCU of any given chunk are determined by applying a hash function to a unique identifier associated with the chunk. In one embodiment, the hash function used for these assignments is a rendezvous hash function. Rendezvous hashing is described in detail at en.wikipedia.org/wiki/Rendezvous_hashing.

For example, the rendezvous hash function may be applied to N hash key values, where each of the hash key values corresponds to a distinct node. The hash key value for a node may be, for example, a unique identifier associated with the chunk concatenated to a unique identifier for the node. Applying these N hash key values to the hash function will produce N hash values, each of which correspond to a node. The nodes associated with the highest hash value and the lowest hash value may be selected as the two host nodes for the chunk.

As an alternative, the node associated with the highest hash value may be selected to be the first host node. The second host node may then be selected based on which node comes next, after the first host node, in a particular order established for the nodes.

These are merely a few ways in which multiple nodes may be selected to host a particular chunk. The techniques described herein are not limited to any particular technique for selecting multiple nodes to host a particular chunk.

Communicating Chunk Assignments

Once the load-operation master has determined the chunk-to-node assignments, the load-operation master broadcasts a message to all other database server instances in cluster 100. According to one embodiment, the message includes various pieces of consistency information, including the target segment metadata (e.g. start address and size of the extents of the target segment), "snapshot information," a list of the database server instances that have been assigned chunks, and "chunk size information."

Snapshot information is information that indicates the state of the target segment that was seen by the load-operation master. The snapshot information is important because that snapshot of the target segment was the basis for the chunk determinations made by the load-operation master. Chunk size information indicates the size of each of chunks 202, 204, 206 and 208. In the case where all chunks are the same size, the chunk size information may be a single size value.

Chunk-to-Node Mappings

Upon receiving the message from the load-operation master, all nodes that have been assigned to host a chunk send to the lock manager of the target segment a request for a shared mode lock on the target segment. Once the load-operation master has released the exclusive mode lock on the target segment, the lock manager of the target segment grants those shared mode locks.

With the snapshot information and the chunk size information, each database server instance is able to determine the boundaries of each chunk. Having determined the boundaries, each database server instance may apply the same hash function that was used by the load-operation master to determine the chunk-to-node mapping.

In addition to loading any chunk that is assigned to it, each database server instance stores in its local volatile memory metadata that reflects the chunk-to-node mapping that it determined. FIG. 3 is a block diagram that illustrates the chunk-to-node mapping information maintained by nodes 102, 112, 122, and 132, according to one embodiment.

In the embodiment illustrated in FIG. 3, each entry in the chunk-to node mappings of any given node corresponds to a chunk. The entry indicates the IMCU, the IMCU boundaries, the IMCU host node locations, and the IMCU offset. The IMCU host node locations indicate one or more host nodes assigned to host the IMCU for the chunk and a registration timestamp corresponding to each host node. As shall be described in greater detail hereafter, the registration timestamp indicates when the host node location was registered in the node.

Thus, the first entry in row 302, in the chunk-to-node mapping for node 102, indicates that for IMCU 222, corresponding to chunk 202, the IMCU host nodes are node 102 and node 122. The registration time for host node 102 is T1A, and the registration time for host node 122 is T2A.

IMCU offset indicates a physical memory offset, if the IMCU is stored in the node's volatile memory. Thus, IMCU offset is null if the host nodes are remote nodes and non-null if the host node is the node creating the chunk-to-node mapping. In the present example, the IMCU offset for IMCU 222 is non-null because node 102 is a host node for IMCU 222. However, the IMCU offset for IMCU 222 in the chunk-to-node mapping of node 112 would be "null" because node 112 is not a host node for IMCU 222.

After the database server instance has completed loading any chunks assigned to it and storing the chunk-to-node mapping in its local volatile memory, it releases the shared mode lock on the target segment.

Registration Timestamp

When a given node determines a host node is assigned to a particular chunk, it "registers" the host node by creating an entry for the chunk in the chunk-to-node mapping and indicating the host node in the entry. If the given node is itself a host node for the chunk, it loads the IMCU for the chunk into its volatile memory before registering itself as a host node.

According to an embodiment, each node maintains a registration timestamp in each entry in the node's chunk-to-node mapping. In an embodiment, in the chunk-to-node mapping for a given node, the registration timestamps indicate when the host nodes for each chunk were registered, by the given node, as hosts for the chunk.

If the given node is itself a host node for a chunk, then the node loads the chunk into its volatile memory before registering itself as a host node for the chunk. Thus, the registration timestamp for the entry that maps the chunk to the given node indicates when the given node loaded the chunk into its volatile memory.

Referring again to FIG. 3, the chunk-to-node mapping indicates [HOST, REG_TIME] where:
  "HOST" indicates a node assigned to host the particular chunk
  "REG_TIME" indicates when the host node was registered in the node that stores the mapping.

In row 302 for IMCU 222 in the chunk-to-node mapping for node 102, row 302 has an entry 304 that indicates that node 102 is a host node for IMCU 222, and an entry 306 that indicates that node 122 is a host node for IMCU 222. Entry 304 indicates the timestamp T1A, while entry 306 indicates timestamp T2A. Thus, node 102 was registered with node 102 as a host of IMCU at time T1A, and node 122 was registered with node 102 as a host of IMCU 222 at time T2A.

In the example illustrated in FIG. 3, node 102 is assigned to host IMCU 222. In an embodiment, node 102 records the registration timestamp T2A for host node 122 as the time when the entry 302 was created. However, the registration timestamp T1A for host node 102 (itself) may be greater than registration timestamp T2A, because node 102 loads the IMCU into its volatile memory before recording the registration timestamp.

The entries for the host nodes assigned to IMCU 224 indicate that the registration timestamps are both T3A. The registration timestamps may be the same because node 102 is not a host node for IMCU 224, so node 102 creates the entries for both hosts (nodes 112 and 132) of IMCU 224 at the same time, without having to load the corresponding chunk itself into memory. Thus, the entries for both hosts of IMCU 224 have identical registration timestamps.

Global Completion Timestamp

Once the database server instance that was the load-operation master finishes its load operation, it attempts to obtain another load-master lock. When all nodes have finished creating their respective chunk-to-node mappings and loading any assigned chunks into their respective volatile memories, they release their shared mode locks on the chunks. The release of the shared locks allows the load-operation master to regain a load-master lock. Consequently, at regaining the load-operation master lock is an event that indicates that all chunks are loaded into the volatile memories of their respective host nodes.

In the present example, database server instance 126 loads IMCU 222 and IMCU 226, and stores the chunk-to-node mapping in volatile memory 124. Database server instance 126 then requests a load-master lock. When database server instance 106, 116, and 136 release their shared mode lock, database server instance 126 receives its exclusive lock.

The load-operation master records a global completion timestamp. The "global completion timestamp" is the timestamp at which the nodes finished loading any chunks assigned to them and storing the chunk-to-node mapping. In an embodiment, the load-operation master records the timestamp at which it receives the load-master lock as the global completion timestamp in its volatile memory.

The load-operation master then broadcasts the global completion timestamp to the other nodes in the cluster. Each node stores in its volatile memory metadata that reflects the global completion timestamp it received.

In an embodiment, the load-operation master records the global completion timestamp in its volatile memory and broadcasts the value to the other nodes in the cluster. Each node stores in its volatile memory metadata that reflects the global completion timestamp it received. A given node may have finished loading its assigned chunk to its volatile memory at a different time than the other nodes in the cluster. However, the global completion time indicates the time at which all nodes in the cluster finished loading their respective assigned chunks.

In an embodiment, multiple chunks may need to be loaded into memory at different times. Thus, each node may store multiple global completion timestamps, each of which corresponds to a different set of one or more chunks. In an embodiment, the global completion timestamp is maintained on a per chunk basis. In such an embodiment, the global completion timestamp for a chunk indicates when all nodes assigned to host the chunk have finished loading the chunk into their respective volatile memories. In another embodiment, each global completion timestamp applies to a set of one or more chunks. In such an embodiment, the global completion timestamp for a set of chunks indicates when all hosts nodes for all chunks in the set of chunks have finished loading their assigned chunks into their respective volatile memories.

For example, referring to FIG. 2, it shall be assumed that a global completion timestamp is maintained for the set of chunks 202, 204, 206 and 208. Such a global completion timestamp would indicates the time after nodes 102 and 122 finished loading IMCUs 222 and 226, nodes 112 and 132 finished loading IMCUs 224 and 228, and each node finished creating its respective chunk-to-node mapping.

If a node joins (or rejoins) the cluster, the nodes need to redistribute the chunks to include the newly joined node. In an embodiment, the new node applies the same hash function used by the other nodes to determine the host node assignments. Similar to the steps described above, the new node creates its chunk-to-node mapping and loads any chunks assigned to itself to its volatile memory. After the node has finished loading the chunks assigned to it and creating the chunk-to-node mapping, the global completion timestamp(s) that covers the chunks loaded by the new node (and any other nodes who received new host assignments) are updated to indicate the time at which redistribution and loading of chunks by all newly-assigned host nodes were completed.

Startup Timestamp

A "startup timestamp" for a node indicates when the node most recently joined the cluster. If a node failed and then rejoined the cluster, then the startup timestamp may indicate the time at which the node rejoined the cluster. Using the startup timestamp, a node may determine whether a particular node joined the cluster before or after all host nodes finished loading their assigned chunks into volatile memory.

For example, referring again to FIG. 2, the global completion timestamp for cluster 100 is maintained for the set of chunks 202, 204, 206 and 208. Thus, the global completion timestamp indicates the time after nodes 102 and 122 finished loading IMCUs 222 and 226, nodes 112 and 132 finished loading IMCUs 224 and 228, and each node finished creating its respective chunk-to-node mapping. Thus, if a new node joins the cluster after this time, its startup timestamp will be greater than the global completion timestamp stored in each node. When the cluster redistributes the chunks and the new node has loaded its assigned chunks into memory, the global completion timestamp will be updated. At that point, the startup timestamp of the new node will then be lesser than the updated global completion timestamp.

In an embodiment, each node stores its respective startup timestamp in its volatile memory. In another embodiment, the cluster maintains a membership table which indicates the nodes available in the cluster, and the startup time for each node is stored in the membership table.

Re-Distribution on Topology Change

When a node fails, its assigned chunks are still hosted by at least one other node. Thus, when a database server instance is selecting a node to process a work granule targeting a chunk hosted by the failed node, the database server instance is able to select one of the other nodes that hosts the chunk. For example, if node 112 fails, IMCU 224 and 228 are no longer available on node 112, but are still available on node 132.

However, the fact that only a single copy of IMCU 224 and 228 remain in the cluster would trigger redistribution of the IMCUs. The redistribution is performed similarly to the initial distribution process described. However, the redistribution should not affect chunks whose host nodes did not fail. For example, failure of node 112 would cause chunks 204 and 208 to be reassigned, but chunks 202 and 206 should not be reassigned, because they reside in the volatile memories of two host nodes, nodes 102 and 122, which have not failed.

Referring to FIG. 4, it illustrates the state of the cluster 100 after redistributing the chunk assignments after failure of node 112. Nodes 102, 122, and 132 remain in the cluster. Chunk 204 has been assigned to node 102 and chunk 208 has been assigned to node 122. Database server instance 106 has created a new copy of IMCU 224 in its volatile memory 104 from the data in chunk 204, and database server instance 126 has create a new copy of IMCU 228 in its volatile memory 124 from the data in chunk 208.

As each node updates its mapping, it also records an updated registration timestamp for the entries that were updated. Referring to FIG. 5, it illustrates the updated chunk-to-node mappings stored in nodes 102, 122, and 132 after node 112 has failed.

In the present example, node 102 is assigned to host IMCU 224 for chunk 204 and node 122 is assigned to host IMCU 228 for chunk 208. Thus, each chunk-to-node mapping indicates the new assignment. The registration timestamps are also updated to reflect the timestamp at which each node updated its entry. The entry for IMCU 224 in the chunk-to-node mapping for node 102 indicates that the IMCU offset is non-null, as IMCU 224 is now locally hosted. The entry for IMCU 228 in the chunk-to-node mapping for node 122 also indicates that the IMCU offset is non-null.

When a node joins the cluster, it will also trigger redistribution of the chunks. The redistribution should only affect chunks that are assigned to the newly joined node. In an embodiment, the node assignments are determined by a rendezvous hash function. If a previously failed node rejoins the cluster, it will be assigned to host the same chunks that it hosted prior to the failure. For example, if node 112 rejoins the cluster 100, it would be assigned to host chunks 204 and 208. Database server instance 102 would discard its copy of IMCU 224 and database server instance 122 would discard its copy of IMCU 228, and database server instance 116 would create a new copy of IMCU 224 and 228 based on the data from chunk 204 and 208. Thus, cluster 100 returns to the state illustrated in FIG. 2. The chunk-to-node mapping would return to the state illustrated in FIG. 3, but with updated registration timestamps corresponding to IMCU 224 and 228, indicating when the entry for each IMCU was updated.

Similar to the distribution process described above, after redistribution is complete, the nodes receive and store an updated global completion timestamp.

Handling Access Requests

When a database application desires data from database 160, the database application sends a query to any one of database server instances 106, 116, 126, and 136. The database server instance that receives the query is called the "query coordinator." The query coordinator generates a query execution plan based on a locally-stored mapping of how the data is distributed across the volatile memories 104, 114, 124, and 134 of the multi-node cluster 100. This query execution plan specifies how the work required by the query is to be separated into work granules that perform work on data from chunks.

In an embodiment, all database server instances in cluster 100 respond to queries that target data from segment S1 by breaking the operation requested by the query into work granules, and distributing those granules based on which nodes are hosting the targeted data.

For example, assume that database server instance 106 receives a query to scan the entire segment S1. In response, database server instance 106 creates a first set of one or more work granules to scan the data that resides in chunk 202, a second set of work granules to scan the data that resides in chunk 204, a third set of work granules to scan the data that resides in chunk 206, and a fourth set of work granules to scan the data that resides in chunk 208.

Distributing Work Granules

Once the query coordinator receives a database command, the query coordinator determines how to break the work required by the database command into granules, and which nodes to select to process each work granule. Using the registration timestamp of the chunk-to-node mapping entry, the global registration timestamp, and the startup timestamp for each node, the database server instance can ensure that a node has successfully loaded the IMCU for any given chunk into memory.

In a stable cluster, the nodes in the cluster first start up. Then, each node performs its independent load operation to load its assigned IMCUs and create its local chunk-to-node mapping. After all the nodes complete their load operations, they receive and store the global completion timestamp. Thus, in a stable cluster scenario:

Global Completion Timestamp>Local Registration Timestamp>Node Startup Time

When the chunks are redistributed after a cluster topology change, each node updates its chunk-to-node mappings and loads any IMCUs assigned to it independently. After redistribution is complete, the nodes receive an updated global completion timestamp.

During redistribution, the old global completion timestamp remains until all nodes have finished loading any assigned IMCUs and updating their chunk-to-node mapping. Thus, during this time, the registration timestamp for an updated entry may be greater than the global completion timestamp. Even though a particular node may have updated its chunk-to-node mapping, the newly assigned host for a chunk may not have finished loading the IMCU for the chunk into its volatile memory. For example, node 102 may determine that newly joined node 112 is assigned to host chunk 208, but node 112 may not have loaded chunk 208 into its volatile memory 116 yet.

Thus, for a work granule that targets a particular chunk, the query coordinator should select a stable host node that has already successfully loaded the IMCU into its volatile memory. The query coordinator may check if a stable host node exists by comparing an entry's registration timestamp, the host nodes' startup timestamps, and the global completion timestamp.

Figure 7:
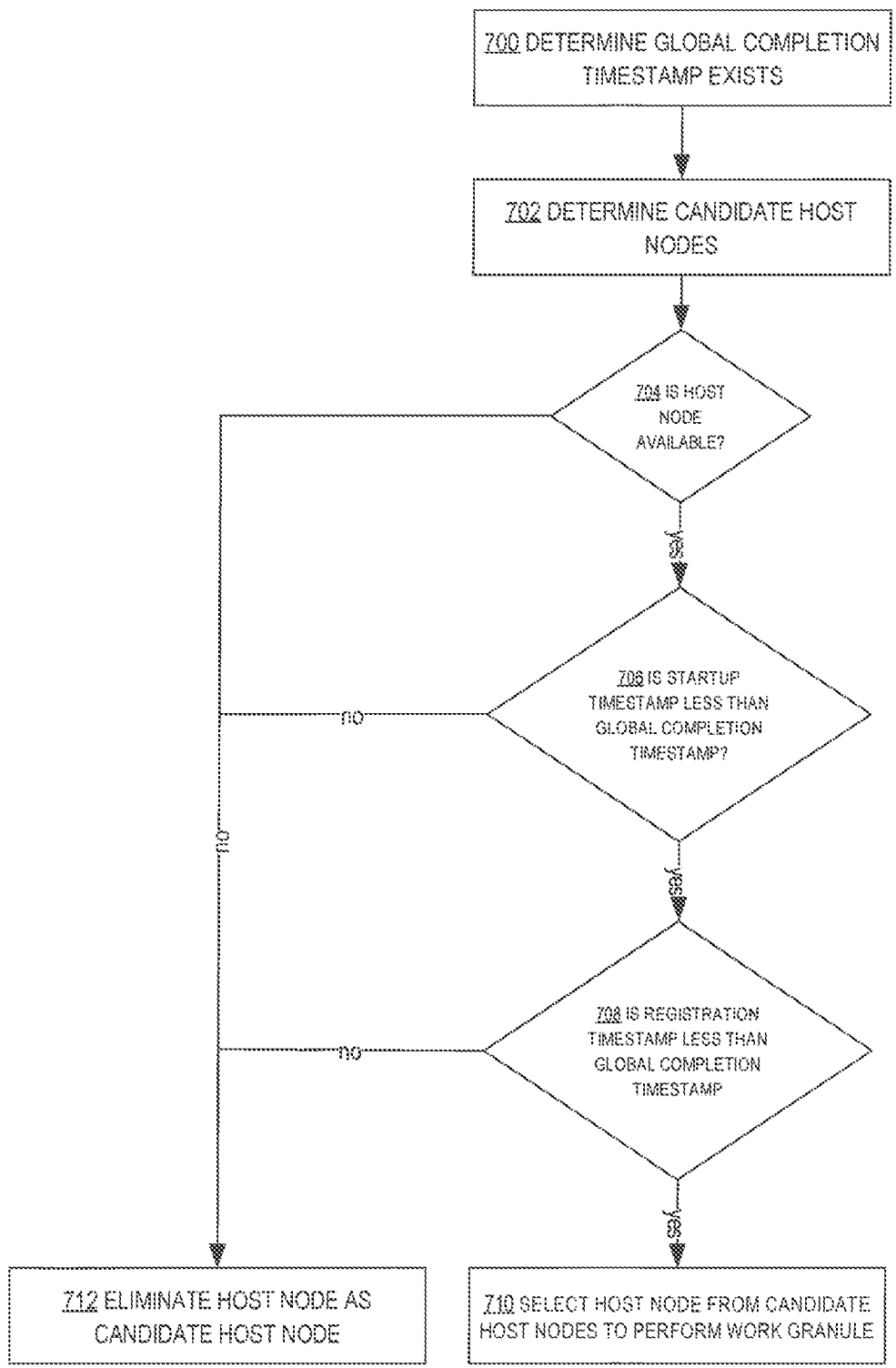
FIG. 7 is a flowchart illustrating steps for selecting a host node to process a work granule.

FIG. 7 is a flowchart that illustrates the host selection operation performed by the query coordinator for the work granules involving a particular chunk, according to one embodiment. For the purpose of illustration, it shall be assumed that database server instance 116 is the query coordinator, and that database server instance is determining where to send work granules involving data that resides in chunk 202.

Referring to FIG. 7, at step 700, the query coordinator determines whether a global completion timestamp exists. If a global completion timestamp has not been recorded, then it cannot be used to determine whether a chunk has been loaded into the volatile memories of its host nodes. In an embodiment, the query coordinator uses its local chunk-to-node mapping to determine whether it is a host for the chunk. If the query coordinator is a host for the chunk and a registration timestamp exists, then the query coordinator has loaded the chunk into its volatile memory. Thus, the query coordinator may assign the work granule to itself to process. In another embodiment, if the global completion timestamp has not been recorded or if the chunk-to-node mapping has not been created, the query coordinator may processes the work granule by accessing data items for the table directly from disk 150.

At step 702 the query coordinator uses its local chunk-to-node mapping to determine which nodes were assigned to host the chunk targeted by the work granule. In the present example, database server instance 116 creates a work granule to scan the data that resides in chunk 202. Database server instance 116 would use its local copy of the chunk-to-node mapping to determine that nodes 102 and 122 are assigned to host chunk 202.

At step 704, the query coordinator checks if each of the host nodes are available. In an embodiment, each database server instance maintains a list of functioning nodes in the cluster. In another embodiment, the query coordinator consults a membership table maintained by the cluster. If at step 704 the query coordinator determines that a host node is not available, then at step 712, the host node is eliminated as a candidate host node. For the purposes of illustration, it shall be assumed that both nodes 102 and 122 are available. Therefore, neither host is eliminated as a candidate during step 704.

At step 706, the query coordinator checks the startup timestamp for each host node. In an embodiment, if the startup timestamp of a host node is greater than the global completion timestamp, but a second host node has a startup timestamp that is lesser than the global completion timestamp, then the database server instance may prefer the second host node as a target candidate. Thus, the query coordinator will proceed to step 712 where the host node is eliminated as a candidate host node. In an embodiment, the host node may remain a candidate host node only if are no other host nodes remaining. For the purposes of illustration, it shall be assumed that the startup timestamps for both nodes 102 and 122 are lesser than the global completion timestamp. Therefore, neither host is eliminated as a candidate during step 706.

At step 708, the query coordinator compares the registration timestamp corresponding to each available host node with the global completion timestamp. If the registration timestamp is lesser than the global completion timestamp, then the host node remains a target candidate for the work granule. In an embodiment, if the registration timestamp is greater than the global completion timestamp, then the host node remains a target candidate only if there are no other host nodes remaining. Thus, if a second host node has a registration timestamp that is lesser than the global completion timestamp, then the database server instance prefers the second host node as a target candidate. The query coordinator will proceed to step 712 where the host node is eliminated as a candidate host node.

In the present example, database server instance 116 would use its local copy of the chunk-to-node mapping to determine the registration timestamp for node 102 and the registration timestamp for node 122. For the purposes of illustration, it shall be assumed that the registration timestamp for node 102 and the registration timestamp for node 122 are lesser than the global completion timestamp. Therefore, neither host is eliminated as a candidate during step 708.

At step 710, the query coordinator selects a host node to perform the work granule. If only one target candidate remains, then that host node is selected to perform the work granule. However, if there are two or more target candidates, then the query coordinator selects a host node from the set of remaining target candidates to process the work granule. In an embodiment, the query coordinator uses a hash function in order to select a host node from the set of remaining target candidates. The query coordinator sends the work granule to the selected host node for processing.

In an embodiment, if the IMCU for the chunk is hosted locally, then the database server instance may assign the work granule to itself to process. However, if the startup time of the local node or the registration timestamp for the chunk is greater than the global completion timestamp, the database server instance may assign the work granule to a remote host instead of assigning it to itself. In the present example, chunk 202 is not hosted by database server instance 116.

In the present example, both hosts remain a candidate after step 708. Therefore, database server instance 116 may select either node 102 or node 122 to process the work granule. For the purposes of illustration, it shall be assumed that database server instance selects node 122 to process the work granule. Database server instance 116 sends the work granule to database server instance 126 on node 122 for processing.

Each node executes the work granules assigned to it, taking advantage of its local in-memory copy of the chunk that it is hosting. Each node then provides its results back to the node that received the query, and that node provides the result back to the database application that issued the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
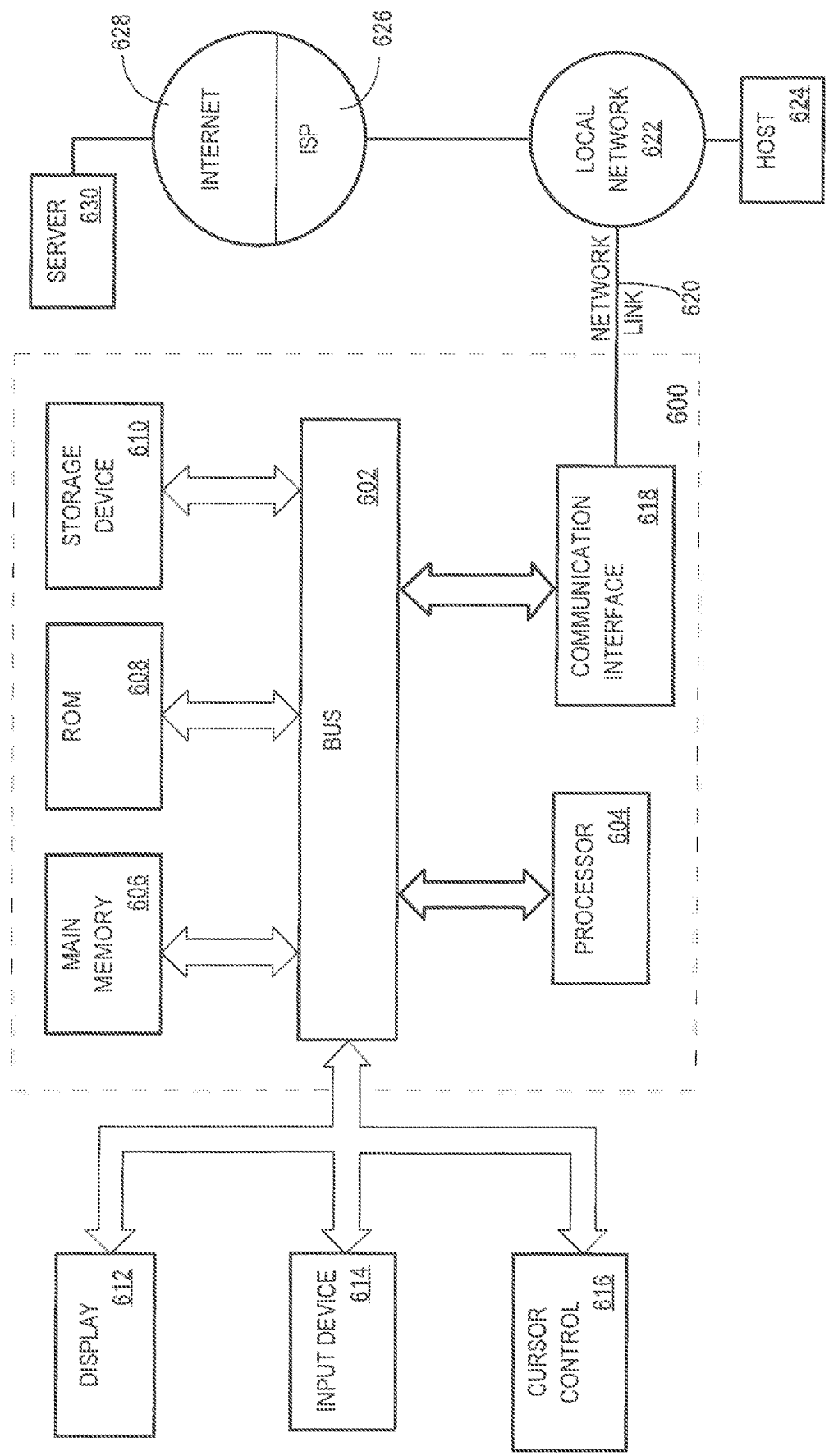
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining, by a map-storing node of a plurality of map-storing nodes in a database system, a mapping that indicates:
        a plurality of chunks of data; and
        for each chunk of the plurality of chunks of data:
            one or more host nodes assigned to said each chunk, and
            for each host node, other than the map-storing node, of the one or more host nodes assigned to said each chunk, a registration timestamp corresponding to a time when the map-storing node established that said each host node was a host of said each chunk;
    loading, by the map-storing node, one or more local chunks of the plurality of chunks into volatile memory of the map-storing node;
    storing, by the map-storing node in the mapping, as the registration time stamp for each local chunk of the one or more local chunks, a time of completion of loading of said each local chunk into the volatile memory;
    in response to a re-distribution event, determining a first set of one or more chunks, of the plurality of chunks, affected by the re-distribution event;
    for each chunk of the first set of chunks:
        determining, by the map-storing node, at least one additional host node for said each chunk;
        updating, by the map-storing node, the mapping to indicate the at least one additional host node and an additional registration timestamp for said each chunk for the at least one additional host node;
    wherein the map-storing node comprises one or more hardware processors;
    for each map-storing node of the plurality of map-storing nodes, storing a global completion timestamp that indicates when all host nodes completed loading one or more assigned chunks, of the plurality of chunks, into their respective volatile memories;
    in response to the re-distribution event, for each map-storing node of the plurality of map-storing nodes, storing an updated global completion timestamp that indicates when the at least one additional host node completed loading one or more assigned chunks, of the first set of chunks, into their respective volatile memories;
    receiving, at a particular map-storing node, a query requiring access to a particular chunk of the first set of chunks;
    in response to receiving the query:
        selecting a particular host node, of one or more host nodes assigned to the particular chunk, based at least in part on the mapping maintained at the particular map-storing node; and
        causing the particular host node to perform work, for the query, that involves accessing data items in the particular chunk.

2. The method of claim 1 further comprising detecting the re-distribution event in response to removal of a node of the one or more host nodes assigned to the first set of one or more chunks.

3. The method of claim 1 further comprising detecting when a node has been added, wherein the re-distribution event is in response to detecting addition of the at least one additional host node.

4. The method of claim 1 further comprising:
    determining a second set of one or more chunks, of the plurality of chunks, that are not affected by the re-distribution event;
    wherein the second set of chunks does not include chunks of the first set of chunks;
    not determining an additional host node for any chunks of the second set of chunks.

5. The method of claim 1, wherein the one or more host nodes assigned to the particular chunk include a first host node and a second host node, wherein the re-distribution event is in response to detecting removal of the first host node, and wherein the selecting the particular host node involves selecting the second host node over the first host node.

6. The method of claim 1, wherein the one or more host nodes assigned to the particular chunk include a first host node where a registration time of the first host node is greater than the global completion timestamp and a second host node where a registration time of the second host node is less than the global completion timestamp, and wherein the selecting the particular host node involves selecting the second host node over the first host node.

7. The method of claim 1, wherein the one or more host nodes assigned to the particular chunk include a first host node where a startup time of the first host node is greater than a registration time corresponding to the first host node and a second host node where a startup time of the second host node is less than a registration time corresponding to the second host node, and wherein the selecting the particular host node involves selecting the second host node over the first host node.

8. The method of claim 1, wherein the one or more host nodes assigned to the particular chunk include a first host node where a startup time of the first host node is greater than a registration time corresponding to the first host node and a second host node where a startup time of the second host node is lesser than a registration time corresponding to the second host node, and
wherein the selecting the particular host node involves selecting the second host node over the first host node.

9. One or more non-transitory computer-readable media storing instructions, which when executed by one or more hardware processors, cause:
maintaining, by a map-storing node of a plurality of map-storing nodes in a database system, a mapping that indicates:
a plurality of chunks of data;
for each chunk of the plurality of chunks of data:
one or more host nodes assigned to said each chunk, and
for each host node, other than the map-storing node, of the one or more host nodes assigned to said each chunk, a registration timestamp corresponding to a time when the map-storing node established that said each host node was a host of said each chunk;
loading, by the map-storing node, one or more local chunks of the plurality of chunks into volatile memory of the map-storing node;
storing, by the map-storing node in the mapping, as the registration time stamp for each local chunk of the one or more local chunks, a time of completion of loading of said each local chunk into the volatile memory;
in response to a re-distribution event, determining a first set of one or more chunks of the plurality of chunks affected by the re-distribution event;
for each chunk of the first set of chunks:
determining at least one additional host node for said each chunk;
each map-storing node, of the plurality of map-storing nodes, updating the mapping to indicate the at least one additional host node and an additional registration timestamp for said each chunk for the at least one additional host node;
for each map-storing node of the plurality of map-storing nodes, storing a global completion timestamp that indicates when all host nodes completed loading one or more assigned chunks, of the plurality of chunks, into their respective volatile memories;
in response to the re-distribution event, for each map-storing node of the plurality of map-storing nodes, storing an updated global completion timestamp that indicates when the at least one additional host node completed loading one or more assigned chunks, of the first set of chunks, into their respective volatile memories;
receiving, at a particular map-storing node, a query requiring access to a particular chunk of the first set of chunks;
in response to receiving the query:
selecting a particular host node, of one or more host nodes assigned to the particular chunk, based at least in part on the mapping maintained at the particular map-storing node; and
causing the particular host node to perform work, for the query, that involves accessing data items in the particular chunk.

10. The one or more non-transitory computer-readable media of claim 9, the instructions further including instructions which, when executed by the one or more hardware processors, cause detecting of the re-distribution event in response to removal of a node of the one or more host nodes assigned to the first set of one or more chunks.

11. The one or more non-transitory computer-readable media of claim 9, the instructions further including instructions which, when executed by the one or more hardware processors, cause detecting the re-distribution event in response to detecting addition of the at least one additional host node.

12. The one or more non-transitory computer-readable media of claim 9, the instructions further including instructions which, when executed by the one or more hardware processors, cause:
determining a second set of one or more chunks, of the plurality of chunks, that are not affected by the re-distribution event;
wherein the second set of chunks does not include chunks of the first set of chunks;
not determining an additional host node for any chunks of the second set of chunks.

13. The one or more non-transitory computer-readable media of claim 9, wherein the one or more host nodes assigned to the particular chunk include a first host node and a second host node, wherein the re-distribution event is in response to detecting removal of the first host node, and wherein the selecting the particular host node involves selecting the second host node over the first host node.

14. The one or more non-transitory computer-readable media of claim 9, wherein the one or more host nodes assigned to the particular chunk include a first host node where a registration time of the first host node is greater than the global completion timestamp and a second host node where a registration time of the second host node is less than the global completion timestamp, and wherein the selecting the particular host node involves selecting the second host node over the first host node.

15. The one or more non-transitory computer-readable media of claim 9, wherein the one or more host nodes assigned to the particular chunk include a first host node where a startup time of the first host node is greater than a registration time corresponding to the first host node and a second host node where a startup time of the second host node is less than a registration time corresponding to the second host node, and wherein the selecting the particular host node involves selecting the second host node over the first host node.

16. The one or more non-transitory computer-readable media of claim 9, wherein the one or more host nodes assigned to the particular chunk include a first host node where a startup time of the first host node is greater than a registration time corresponding to the first host node and a second host node where a startup time of the second host node is lesser than a registration time corresponding to the second host node, and wherein the step of selecting the particular host node involves selecting the second host node over the first host node.

* * * * *